United States Patent [19]

Eckert

[11] 4,258,680
[45] Mar. 31, 1981

[54] RECIPROCATING ENGINE WITH CYLINDRICAL COMBUSTION CHAMBER

[75] Inventor: Konrad Eckert, Stuttgart, Fed. Rep. of Germany

[73] Assignee: Robert Bosch GmbH, Stuttgart, Fed. Rep. of Germany

[21] Appl. No.: 18,558

[22] Filed: Mar. 8, 1979

[30] Foreign Application Priority Data

Mar. 8, 1978 [DE] Fed. Rep. of Germany ....... 2809968

[51] Int. Cl.³ .............................................. F02B 19/04
[52] U.S. Cl. .................................... 123/254; 123/263; 123/280; 123/289
[58] Field of Search ................. 123/30 C, 30 D, 32 B, 123/32 J, 191 M, 191 A, 193 P

[56] References Cited

U.S. PATENT DOCUMENTS

| | | | |
|---|---|---|---|
| 2,121,813 | 6/1938 | Mitchell | 123/32 B |
| 4,052,972 | 10/1977 | Mizunuma et al. | 123/32 B X |

FOREIGN PATENT DOCUMENTS

| | | | |
|---|---|---|---|
| 490692 | 2/1953 | Canada | 123/32 B |
| 536592 | 10/1931 | Fed. Rep. of Germany | 123/32 B |

*Primary Examiner*—Tony M. Argenbright
*Attorney, Agent, or Firm*—Edwin E. Greigg

[57] ABSTRACT

A reciprocating internal combustion engine has a cylindrical combustion chamber lying substantially entirely within the cylinder head and including a fuel injection nozzle and possibly a glow plug. The top of the cylindrical combustion chamber is defined by the disc of the intake poppet valve and the bottom of the combustion chamber is defined at top dead center by a projection of the piston which is formed in a piston cap that consists of thermally resistant material and within which there is an air-filled void that prevents the heat transfer from the combustion chamber to the main body of the piston. This construction permits high surface temperatures within the combustion chamber without attendant heavy thermal stresses in the body of the piston.

4 Claims, 2 Drawing Figures

RECIPROCATING ENGINE WITH CYLINDRICAL COMBUSTION CHAMBER

FIELD OF THE INVENTION

The invention relates to reciprocating internal combustion engines. More particularly, the invention relates to reciprocating engines in which the piston and cylinder head together define a combustion chamber of particular shape at the moment of top dead center.

BACKGROUND OF THE INVENTION

Known in the art is an internal combustion engine in which a combustion chamber having the shape of a right circular cylinder is defined within the top of the piston. The piston is also provided with channels or depressions that terminate in the combustion chamber tangentially and cause therein a rotary motion of the compressed air. In the known engine, fuel is injected by means of a two-port injection nozzle which is located substantially perpendicular to the axis of the cylinder and is disposed within the cylinder wall in an appropriate recess thereof. The injection jets pass to either side of the central axis of the combustion chamber and parallel to its bottom. The known engine has the disadvantage that the relatively deep channels in the piston as well as the recess in the cylinder wall which is required for fuel injection cause the orderly flow of air to be disturbed and also increases the effective surface areas. The latter has a detrimental effect on mixture preparation and on the flame propagation velocity and also results in detrimental thermal losses. At the same time, the presence of the combustion chamber within the piston increases the thermal stresses of the piston. A still further disadvantage of the known engine is that the presence of the fuel injection valve in the cylinder wall or the cylinder sleeve decreases the life expectancy of these parts and increases the heat transfer problems.

OBJECT AND SUMMARY OF THE INVENTION

It is thus a principal object of the present invention to provide an internal combustion engine in which a combustion chamber is so defined at top dead center as to permit the generation of an orderly rotary air flow. It is an associated object of the present invention to provide an engine in which the combustion chamber is compact and substantially contains the entire compressed gas volume at top dead center. Still another associated object of the invention is to provide an engine in which the air flow in the combustion chamber is undisturbed by openings or recesses in the surface of the cylindrical combustion chamber. Yet another object of the invention is to reduce the effective surface area of the combustion chamber, thereby reducing thermal losses. Still another object of the invention is to reduce the thermal losses to the piston while maintaining the surfaces defining the combustion chamber at high temperature. The latter object includes the advantage of rapid evaporation of any fuel which may impinge on the walls.

All the aforementioned objects and other objects and advantages still to be discussed are attained according to the invention by providing a combustion chamber of a circular cylindrical shape substantially within the cylinder head of the engine and by further shaping the top of the piston in such a manner that at top dead center, the sculptured piston top and the recess in the cylinder head together define the combustion volume of the engine. The objects of the invention are further attained by providing that the sculptured piston top is made of a material which is particularly resistant to the effects of heat and which is capable of providing thermal insulation with respect to the remainder of the piston.

In an advantageous embodiment of the invention, the top of the piston is a projection in which are present one or more depressions which act as guide channels for the injected fuel.

The invention will be better understood as well as further objects and advantages thereof become more apparent from the ensuing detailed description of a preferred exemplary embodiment taken in conjunction with the drawing.

DESCRIPTION OF THE PREFERRED EMBODIMENT

Figure 1:
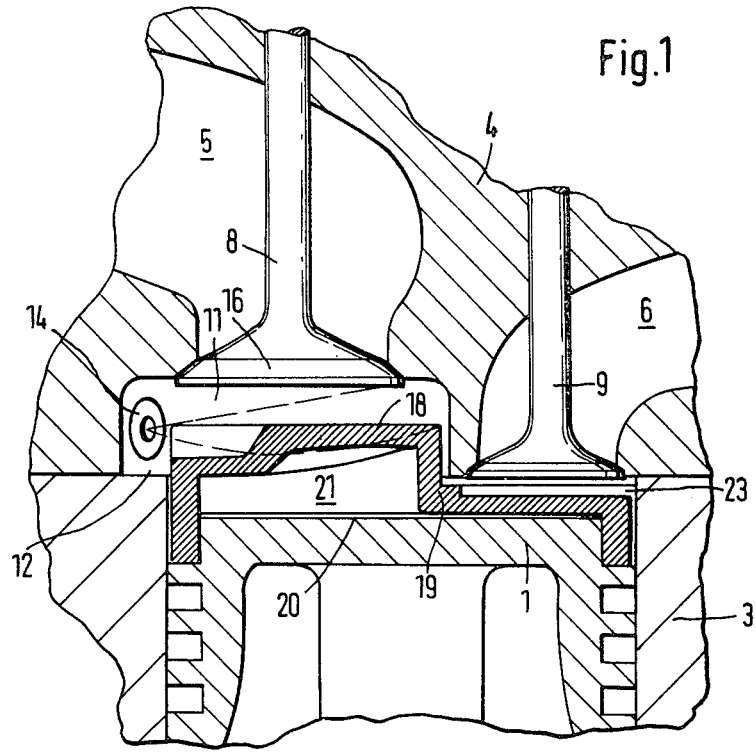
FIG. 1 is an axial section through a portion of a cylinder head, an associated cylinder and the piston moving therein.

Turning now to FIG. 1, there will be seen in partial section a piston 1 belonging to a reciprocating internal combustion engine the further details of which are not shown and may be assumed to be conventional. In known manner, the piston is guided within a cylindrical bore 3 which is closed at one end by a cylinder head 4. Disposed within the cylinder head is an air induction channel 5 and two exhaust outlet channels 6 which are closed and opened by a respective inlet poppet valve 8 and two exhaust poppet valves 9. In known manner, these valves serve for the orderly admission and exhaust of gases to and from the combustion chamber.

In the illustrated top dead center position of the piston, the combustion volume is substantially defined only by a combustion chamber 11 of circular cylindrical shape whose central axis coincides with the central axis of the inlet valve 8. The combustion chamber 11 has the overall configuration of a flat disc which lies substantially entirely within the cylinder head and which is open in the direction of the cylinder bore 3. Most of the volume of the combustion chamber 11 lies within the imaginary extension of the cylindrical bore 3 but a relatively narrow, crescent-shaped portion 12 thereof extends laterally from the aforementioned cylindrical projection of the bore 3. In this crescent-shaped region, a fuel injection nozzle 14 is disposed at a point substantially half-way between the top and bottom of the combustion chamber 11. The fuel injection nozzle 14 is preferably a single-jet nozzle which is so oriented that its fuel jet will pass to one side of the imaginary central axis of the combustion chamber 11. Optionally, a glow plug 15 may be inserted in the wall of the crescent-shaped portion 12 of the combustion chamber.

The basically flat top of the combustion chamber 11 is defined by the valve disc 16 of the inlet poppet valve 8. The bottom of the combustion chamber 11 is defined at the moment of TDC by the top of the piston and, in particular, by a projection 18 of a piston top 19 that is attached to the piston. At least the projection 18 of the piston top 19 consists of a heat-resistant material and defines, together with the end face 20 of the remainder of the piston, an insulating air-filled space 21 which prevents conductive heat transfer to the main part of the piston during operation while permitting very high temperatures of the projection 18.

Figure 2:
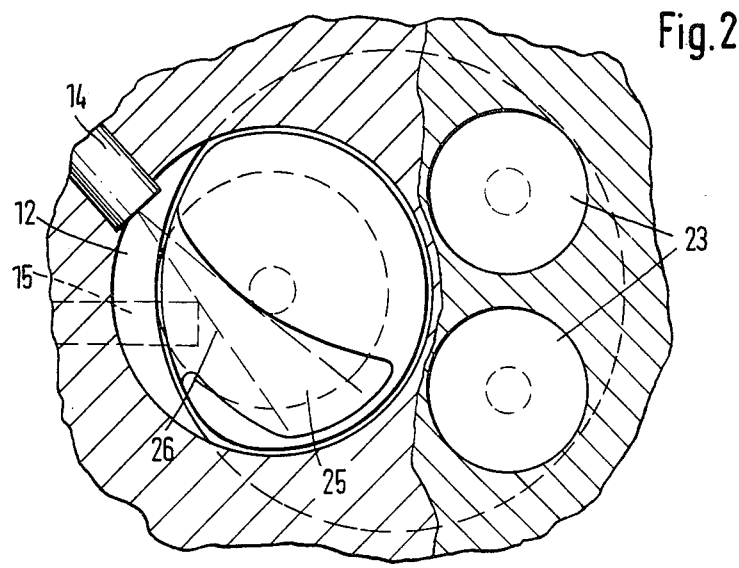
FIG. 2 is a horizontal section through the combustion chamber according to the engine and associated elements of the engine.

The configuration of the projection 18 may be seen from the illustrations of FIGS. 1 and 2. The projection 18 is seen to be substantially circular and cylindrical, the majority of its diameter being substantially equal to that of the combustion chamber 11 except for the aforementioned crescent-shaped portion 12 whose effective radius is that of the cylindrical bore 3. The remainder of the piston top 19 is substantially flat except for possible recesses 23 in the region of the exhaust valves which permit satisfactory opening strokes of the exhaust valves while minimizing the remaining combustion chamber volume between the piston and the cylinder head.

The projection 18 has a channel-like depression 25, best seen in FIG. 2, which has a light curvature substantially in the direction of the rotary air flow in the combustion chamber 11 and which begins at or near the point of fuel flow from the injection nozzle 14 with relatively great depth and then becomes gradually more shallow until it merges with the top of the projection 18 at its far end, substantially at the diametrically opposite side of the combustion chamber 11. The relative location of the exhaust valves 9 may be seen from the position of the recesses 23 in FIG. 2 and is thus found to be entirely within the imaginary extension of the cylindrical bore 3. This disposition results in a very compact configuration of all elements and a low number of surface discontinuities, in turn resulting in low thermal losses and low gas transfer losses.

The air induction channel 5 is so constructed as to impart to the entering air stream a well-defined rotation which causes a vortex flow whose axis is substantially coincident with the longitudinal axis of the inlet valve and of the combustion chamber 11. The fuel is then injected into this well-defined air flow so as to traverse a relatively long path within the air of the combustion chamber and to experience a minimum of contact with the combustion chamber walls. The rotary air flow carries the individual fuel drops with it, causing them to dwell within the air flow for a relatively long time and preventing contact with the walls. The generation and maintenance of the rotary air flow is in no way diminished by the combustion chamber 11 due to its cylindrical form. A particular purpose served by the recess 25 is to diminish the overall height of the cylindrical combustion chamber 11 which is especially advantageous in Diesel engines so as to permit the attainment of the relatively high compression ratios of such engines.

The foregoing relates to a merely preferred exemplary embodiment of the invention, it being understood that other embodiments and variants thereof are possible within the spirit and scope of the invention.

What is claimed and desired to be secured by Letters Patent of the United States is:

1. A reciprocating internal combustion engine comprising
   an engine block defining a cylinder,
   a piston moving reciprocatingly in said cylinder,
   a cylinder head mounted in association with said engine block,
   intake and exhaust valves,
   said cylinder, said piston and said cylinder head jointly with a valve plate of the intake valve defining a combustion chamber at the top dead center position of said piston,
   said combustion chamber lying substantially entirely within said cylinder head and having the shape of a right circular cylinder one end face of which is defined by a disc of said intake valve of the engine,
   said piston being provided with a cap portion defining a projection,
   said projection having a substantially flat surface defining an end face of said combustion chamber and including a recess which defines a guide channel having a light curvature substantially in the direction of rotary air flow in the combustion chamber beginning at or near a point of fuel flow from the injection nozzle with relatively great depth and then becomes gradually more shallow until it merges with the top of the projection at its far end substantially at the opposite side of the combustion chamber,
   said projection substantially constituting the other end face of said combustion chamber at top dead center of said piston,
   the interior of said projection defining a void which serves as a thermal barrier, and
   a fuel injection nozzle disposed in a side wall of said combustion chamber and so oriented as to emit a jet of fuel substantially perpendicular to the cylindrical axis of said combustion chamber along said guide channel.

2. An internal combustion engine according to claim 1, wherein said recess and said fuel injection nozzle are so oriented that the fuel stream traveling in said recess passes to one side of the central cylindrical axis of said combustion chamber.

3. A reciprocating engine according to claim 1, wherein said engine is provided with two separate exhaust valves the effective flow channel through which lies within the cylindrical extension of said piston, both valves being located within said cylinder head.

4. A reciprocating engine according to claim 1, further comprising means for generating a rotary air flow in the air stream admitted by said intake valve.

* * * * *